J. P. Headcock,
Making Barrel Heads.
Nº 10,594. Patented Mar. 7, 1854.
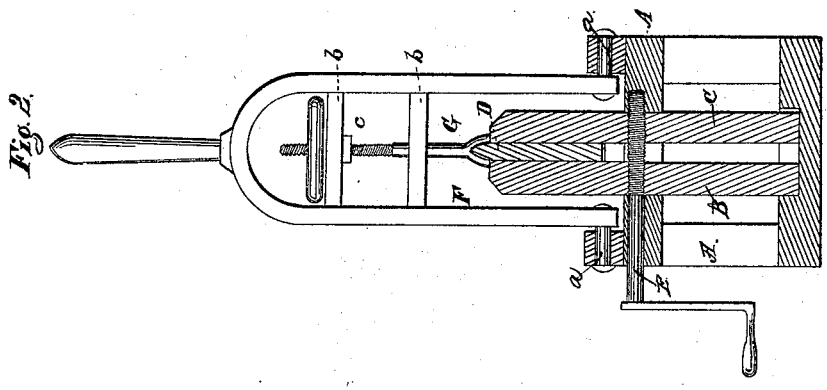
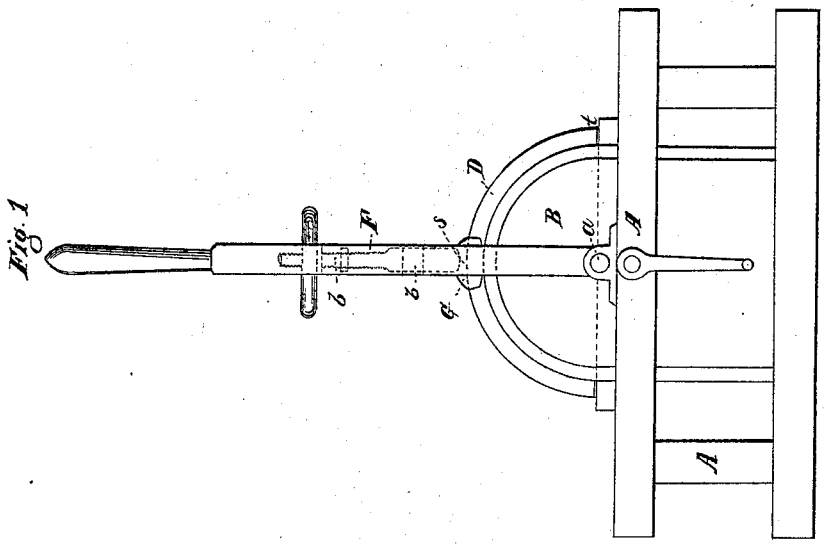

UNITED STATES PATENT OFFICE.

JOEL P. HEACOCK, OF MARLBORO, OHIO.

APPARATUS FOR ROUNDING AND BEVELING BARREL-HEADS.

Specification of Letters Patent No. 10,594, dated March 7, 1854.

*To all whom it may concern:*

Be it known that I, JOEL P. HEACOCK, of Marlboro, in the county of Stark and State of Ohio, have invented a new and useful Improvement in the Manner of Rounding and Beveling the Heads of Barrels; and I do hereby declare that the following is a full, clear, and exact description of the same, reference being had to the accompanying drawings, forming part of this specification, in which—

Figure 1 is a side elevation of the machine. Fig. 2 is a vertical transverse section of the clamping jaws and bench, the other parts being shown in elevation.

The same letters of reference in each of the two figures refer to corresponding parts.

The nature of my invention consists in the employment of two jaws or clamps for holding the stuff for forming the barrel heads, in combination with a double edged or V shaped adjustable cutter which is attached in a suitable manner to a swinging lever and moved back and forth in the path of a circle from a horizontal to a vertical position and vice versa and thereby made to give the proper circular shape and bevel to the stuff which is to form the barrel head.

By the use of this simple contrivance it will be seen that barrel heads of all thicknesses and diameters may be rounded and beveled in the shortest space of time in a complete and perfect manner to fit the croze.

To enable others to understand more fully my invention I will proceed to describe its construction and operation.

A, represents a bench or frame to which the apparatus is attached as shown in the drawing.

B, C, are the clamping jaws, for holding the stuff D, in the manner shown in Fig. 2, during the rounding and beveling operations. One of these jaws, that lettered C, is made adjustable and moved toward and from that B, by the screw E; the stuff D, is placed between these jaws and screwed up as shown in Fig. 2.

F, is a forked or two pronged lever, the prongs of which turn on the pins or fulcrums $a$, $a$, on either side of the clamps. The prongs of this lever are united together by the cross ties $b$, $b$, through the center of which the screw end $c$, of the adjustable V shaped cutter G passes, the thread of the screw fitting a thread in the cross ties. It is by this screw and the wheel on its upper extremity that the cutter G is adjusted so as to cut heads of different diameters. The cutter G has an edge on both sides and consequently cuts both ways—back and forward.

Operation: The stuff is placed between the jaws and secured. The lever is pulled down from the vertical position shown in Fig. 1, to a horizontal position toward one end of the bench which operation causes the stuff to be rounded and beveled from the point $s$, to the point $t$. This being done the lever is raised again to a vertical position, and it is again moved to a horizontal position in a reverse direction to that just mentioned or toward the other end of the bench, thus cutting the other side of the stuff and rounding and beveling it in a similar manner and thereby forming a continuous semicircle of the edge of the stuff and completing and giving it the proper shape to fit the croze.

What I claim as my invention and desire to secure by Letters Patent, is—

Rounding and beveling a barrel head at one operation in a very true and perfect manner by the employment of a double edged adjustable cutter secured in a swinging frame or forked lever and moved from a vertical to a horizontal position—and vice versa—back and forth from one end of the stuff to the other—in combination with the clamping jaws for holding the stuff in a proper position while being operated upon, substantially as herein fully set forth and described.

JOEL P. HEACOCK.

Witnesses:
LEVI BURDEN,
JOSEPH M. ORR.